United States Patent
Burns et al.

(10) Patent No.: US 10,133,345 B2
(45) Date of Patent: Nov. 20, 2018

(54) VIRTUAL-REALITY NAVIGATION

(71) Applicant: MICROSOFT TECHNOLOGY LICENSING, LLC, Redmond, WA (US)

(72) Inventors: Aaron Mackay Burns, Newcastle, WA (US); Robert Ferrese, Redmond, WA (US); Brent J. Elmer, Duvall, WA (US); Timothy D. Kviz, Seattle, WA (US); Benjamin John Sugden, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/077,686

(22) Filed: Mar. 22, 2016

(65) Prior Publication Data

US 2017/0277256 A1    Sep. 28, 2017

(51) Int. Cl.
| | |
|---|---|
| *G09G 5/00* | (2006.01) |
| *G06F 3/01* | (2006.01) |
| *G02B 27/00* | (2006.01) |
| *G02B 27/01* | (2006.01) |
| *G06T 19/00* | (2011.01) |
| *G06F 3/0481* | (2013.01) |

(52) U.S. Cl.
CPC ......... *G06F 3/013* (2013.01); *G02B 27/0093* (2013.01); *G02B 27/017* (2013.01); *G06F 3/04815* (2013.01); *G06T 19/006* (2013.01); *G02B 2027/0178* (2013.01)

(58) Field of Classification Search
CPC .............................. G06T 19/006; G06T 19/00
USPC ......................................................... 345/633
See application file for complete search history.

(56) References Cited

U.S. PATENT DOCUMENTS

| | | |
|---|---|---|
| 6,578,962 B1 | 6/2003 | Amir et al. |
| 7,532,230 B2 | 5/2009 | Culbertson et al. |
| 8,106,910 B2 | 1/2012 | Pugach et al. |
| 8,593,375 B2 | 11/2013 | Maltz |
| 9,256,071 B1 * | 2/2016 | Spitzer ................. G02B 27/017 |

(Continued)

OTHER PUBLICATIONS

Piumsomboon, et al., "User-Defined Gestures for Augmented Reality", In Proceedings of Extended Abstracts on Human Factors in Computing Systems, Apr. 27, 2013, pp. 1-18.

(Continued)

*Primary Examiner* — Jin Ge
(74) *Attorney, Agent, or Firm* — Alleman Hall Creasman & Tuttle LLP

(57) ABSTRACT

A field of view of a virtual environment is visually presented via a near-eye display from a first perspective. A begin-adjustment command is received. A peripheral region of the field of view that surrounds a wearer's gaze target is dimmed, via the near-eye display, based on the begin-adjustment command. A navigation command is received. The field of view of the virtual environment is adjusted from the first perspective to a second perspective based on the navigation command. An end-adjustment command is received. The peripheral region of the field of view is brightened, via the near-eye display, based on the end-adjustment command. The field of view of the virtual environment is visually presented, via the near-eye display, from the second perspective.

13 Claims, 10 Drawing Sheets

(56) References Cited

U.S. PATENT DOCUMENTS

| | | | |
|---|---|---|---|
| 2012/0019662 A1* | 1/2012 | Maltz | G06F 3/013 348/158 |
| 2012/0105483 A1 | 5/2012 | Fedorovskaya et al. | |
| 2012/0113223 A1 | 5/2012 | Hilliges et al. | |
| 2013/0007668 A1* | 1/2013 | Liu | G06F 3/012 715/841 |
| 2013/0208014 A1* | 8/2013 | Fleck | G06K 9/00684 345/672 |
| 2013/0307875 A1 | 11/2013 | Anderson | |
| 2014/0160129 A1 | 6/2014 | Sako et al. | |
| 2014/0225918 A1 | 8/2014 | Mittal et al. | |
| 2014/0268356 A1 | 9/2014 | Bolas et al. | |
| 2014/0361988 A1 | 12/2014 | Katz et al. | |
| 2014/0375683 A1* | 12/2014 | Salter | G06F 3/013 345/633 |
| 2015/0169070 A1* | 6/2015 | Harp | G06F 3/017 345/419 |
| 2015/0193018 A1* | 7/2015 | Venable | G06F 3/0346 345/158 |
| 2016/0027212 A1* | 1/2016 | Da Veiga | G02B 27/0172 345/633 |
| 2016/0324580 A1* | 11/2016 | Esterberg | A61B 34/10 |
| 2017/0038837 A1* | 2/2017 | Faaborg | G06F 3/0482 |

OTHER PUBLICATIONS

Oravec, Matej, "Interaction with 3D Objects in Augmented Reality on Android Platform", In Master Thesis of Masaryk University, Retrieved on: Dec. 4, 2015, 60 pages.

Soh, et al., "User-friendly 3D object manipulation gesture using kinect", In Proceedings of the 12th ACM SIGGRAPH International Conference on Virtual-Reality Continuum and Its Applications in Industry, Nov. 17, 2013, pp. 231-234.

Castellina, E. et al., "Multimodal Gaze Interaction in 3D Virtual Environments", In Proceedings of the 4th Conference on Communication by Gaze Interaction-Communication, Environment and Mobility Control, Sep. 2, 2008, Prague, Czech Republic, 5 Pages.

ISA European Patent Office, International Search Report and Written Opinion Issued in PCT Application No. PCT/US2017/022230, dated May 24, 2017, WIPO, 12 Pages.

\* cited by examiner

VIRTUAL-REALITY NAVIGATION

BACKGROUND

A virtual-reality experience simulates a three-dimensional real world and/or imagined world. In one example, a virtual-reality experience is provided to a user by a computing system that visually presents a virtual environment to the user's eye(s) via a near-eye display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A field of view of a virtual environment is visually presented via a near-eye display from a first perspective. A begin-adjustment command is received. A peripheral region of the field of view that surrounds a wearer's gaze target is dimmed, via the near-eye display, based on the begin-adjustment command. A navigation command is received. The field of view of the virtual environment is adjusted from the first perspective to a second perspective based on the navigation command. An end-adjustment command is received. The peripheral region of the field of view is brightened, via the near-eye display, based on the end-adjustment command. The field of view of the virtual environment is visually presented, via the near-eye display, from the second perspective.

DETAILED DESCRIPTION

Navigating a virtual environment in a virtual-reality experience can be unintuitive to some users. In particular, interactions that involve rotating and/or translating the virtual environment can differ from expectations of some users. For example, some users may expect a clockwise rotation to mean that a virtual position in the virtual environment moves clockwise relative to the user's perspective, and other users may expect the user's perspective to move clockwise relative to the virtual position in the virtual environment. In either case, some users may be left feeling disoriented due to the navigation feeling "backwards." Moreover, due to the immersive nature of the virtual-reality experience, such a divergence from expectations may amplify a level of discomfort for some users.

Accordingly, the present description is directed to an approach for visually presenting a virtual environment in a manner that reduces a level of discomfort of a user. In particular, the approach includes dimming a peripheral region of a field of view of the virtual environment during a navigation (e.g., rotation or translation) to draw the user's focus to a particular virtual location/object in the virtual environment that is not dimmed. By drawing the user's focus to a particular virtual location/object, the user is visually influenced or "tricked" into perceiving that just the virtual location/object is being manipulated by the navigation when in actuality the entire virtual environment is being manipulated by the navigation. According to such an approach, a level of discomfort that the user could potentially experience during the navigation is dampened.

Figure 1:
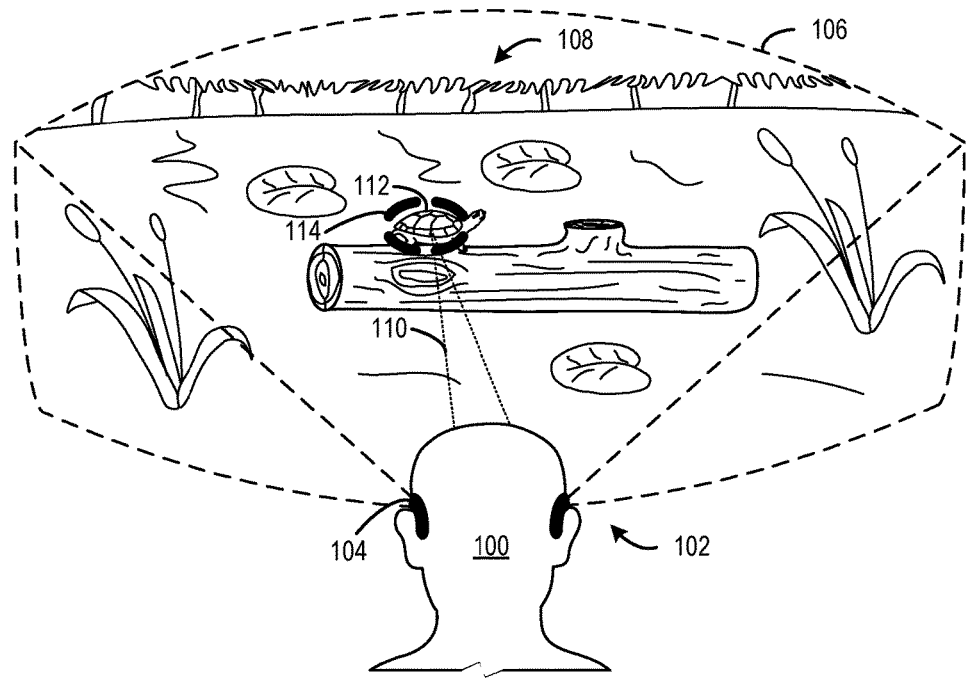
FIG. 1 shows an example virtual-reality computing system visually presenting a perspective of a virtual environment to a user via a near-eye display.

FIG. 1 shows a user 100 wearing a virtual-reality computing system 102. The virtual-reality computing system 102 includes a near-eye display 104. The near-eye display 104 is configured to visually present a field of view (FOV) 106 of a virtual environment 108 to the user 100. The virtual environment 108 may simulate a real world and/or an imagined world, allowing the user 100 to interact with that virtualized world.

In the depicted example, the field of view 106 of the near-eye display 104 visually presents a first-person perspective of the virtual environment 108. In particular, this perspective of the virtual environment 108 depicts a virtual turtle standing on a virtual log that is floating in a virtual river. The virtual turtle is positioned sideways facing rightward relative to this perspective. Note that this perspective is meant to be non-limiting, and any suitable perspective of any suitable virtual environment may be visually presented in the field of view 106 of the near-eye display 104.

The virtual-reality computing system 102 may be configured to track the user's gaze 110 and recognize the user's gaze target 112. Further, the near-eye display 104 may be configured to visually present a gaze target indicator 114 that provides visual feedback to the user 100 of the user's gaze target 112. In the depicted example, the user's gaze 110 is focused at the location of the virtual turtle, and thus the user's gaze target 112 is the virtual turtle. The user's gaze 110 may be directed to any suitable location within the field of view 106 of the near-eye display 104. Moreover, the user's gaze target 112 may be located in any suitable position within the field of view 106 of the near-eye display 104.

The virtual-reality computing system 102 may be configured to temporarily decrease immersion of the virtual-reality experience while a navigation of the virtual environment 108 is being performed. In particular, the virtual-reality computing system 102 may be configured to temporarily dim a peripheral region of the field of view 106 to at least partially conceal a portion of the virtual environment 108 while a navigation is being performed. Once the navigation has been completed, the peripheral region of the field of view 106 may be brightened relative to the dimmed state (e.g., undimmed back to the brightness level and/or returned to a transparency level prior to the navigation being performed) to reveal a different perspective of the virtual environment 108 resulting from the navigation. Such dimming may visually influence or "trick" the user 100 into perceiving that just a virtual object is being manipulated by the navigation when in actuality the entire perspective of virtual environment 108 is being manipulated by the navigation.

As used herein, a "navigation" means one or more operations that change a perspective of the virtual environment 108 that is visually presented in the field of view 106 of the near-eye display 104. One or more dimensions of the perspective may be changed (e.g., horizontal, vertical, depth, yaw, pitch, and/or roll). Non-limiting examples of a navigation include a rotation, a translation, and a combination of a rotation and a translation. A navigation may change the perspective of the virtual environment that is visually presented in the field of view 106 of the near-eye display 104 in any suitable manner. For example, the perspective may be rotated by any suitable number of degrees and/or translated by any suitable distance.

The virtual-reality computing system 102 may be configured to perform a navigation that changes a perspective of the virtual environment 108 that is visually presented in the field of view 106 of the near-eye display 104 based on control commands. In some implementations, the virtual-reality computing system 102 may be configured to enter a navigation mode based on a begin-adjustment command. The virtual-reality computing system 102 may be configured to perform one or more navigations based on one or more navigation commands a rotation command, a translation command) while in the navigation mode. Further, the virtual-reality computing system 102 may be configured to exit the navigation mode based on an end-adjustment command.

In some implementations, the virtual-reality computing system 102 may be configured to perform rotations and translations in separate adjustment modes. For example, these specific types of adjustment modes may differ by having different indicators and/or adjustment mechanisms that aid the user in performing the particular type of navigation associated with the particular type of adjustment mode.

The above described commands may be generated via user input to the virtual-reality computing system 102. In some implementations, the virtual-reality computing system 102 may be configured to generate such commands based on receiving user input via controls (e.g., buttons, dials, and/or joysticks) included in the virtual-reality computing system 102. In some implementations, the virtual-reality computing system 102 may be configured to generate such commands based on receiving user input from a peripheral user-input device. Non-limiting examples of a peripheral user-input device that can be used to control visual presentation of the virtual environment 108 may include, but are not limited to, a hand-held controller (e.g., a game console controller), a touch-input device (e.g., a touch pad), a smartphone, a tablet, a keyboard, and a mouse. Any suitable peripheral user-input device may be used to provide user input to the virtual reality computing system 102 to control visual presentation of the virtual environment 108.

In one example, the begin-adjustment command is generated based on a button on a game controller being pressed, navigation commands are generated based on manipulation of a joystick of the game controller, and the end-adjustment command is generated based on a different button of the game controller being pressed. In another example, the same button on the game controller is used to generate the begin-adjustment command and the end-adjustment command. In another example, a button on the game controller is pressed and held down to generate the begin-adjustment command and the button is released to generate the end-adjustment command. In another example, a begin-adjustment command is generated responsive to a user touching a smart phone display, a rotation command is generated based on a user making a circular motion on the display, and an end-adjustment command is generated responsive to the display touch ending.

In some implementations, the virtual-reality computing system 102 may be configured to generate such commands via natural user input from the user 100. Natural user input may include, but is not limited to, voice commands, head pose/motion, gestures, and the user's eye gaze. The virtual-reality computing system 102 may be configured to recognize natural user input of the user 100 based on sensor information received from any combination of sensors of the virtual-reality computing system 102 and/or external to the virtual-reality computing system 102. Such sensors will be discussed in further detail below with reference to FIG. 10.

In one example, the begin-adjustment command and the end-adjustment command are generated based on distinct head nods. In another example, the begin-adjustment command is generated based on the user 100 making a fist with a hand. Circular motion of the closed fist causes corresponding rotations of the perspective of the virtual environment 108. Further, the end-adjustment command is generated base on the user 100 opening the closed fist. In another example, the begin-adjustment command is generated based on the user's gaze target dwelling at a particular virtual location/object in the virtual environment 108 for a threshold dwell time. Further, the virtual-reality computing system 102 performs a navigation based on the changes to a user's gaze target subsequent to the begin-adjustment command.

In some implementations, a combination of user input provided via a user input device and natural user input may be used to generate control commands to perform a navigation of the virtual environment 108. In one example, the begin-adjustment and end-adjustment commands may be provided by pressing a button on a game controller, and the navigation command may be provided based on the user's eye gaze target subsequent to the begin-adjustment command. The virtual-reality computing system 102 may be configured to perform a navigation of the virtual environment 108 based on user input from any suitable combination of user input modalities.

FIGS. 2-5 show an example rotation of the virtual environment from the perspective shown in FIG. 1 to a different perspective according to the approach discussed above. Note that FIGS. 2-4 include a first person perspective 201 of the field of view 106 as seen by a user viewing the virtual environment 108 via the near-eye display. FIGS. 2-5 also shows a top-view perspective 201' of selected aspects of the virtual environment 108. The top view perspective 201' is not displayed by the near-eye display 104.

Figure 2:
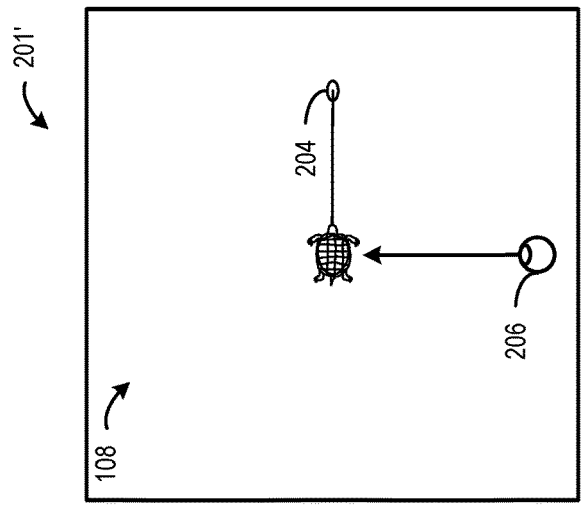
FIGS. 2-4 show an example approach for rotating the virtual environment from the perspective shown in FIG. 1 to a different perspective.
Figure 2:
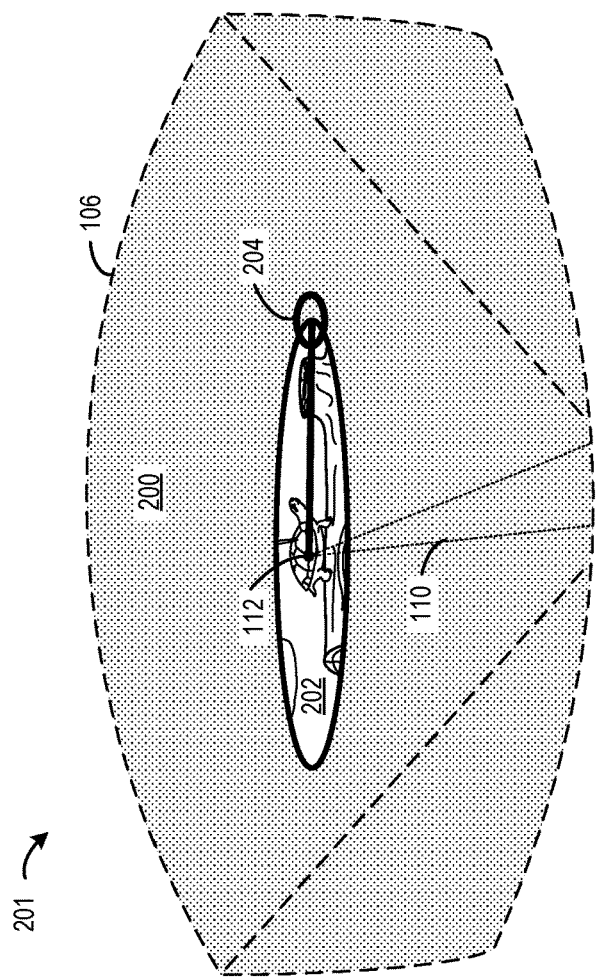

As shown in FIG. 2, the virtual-reality computing system 102 dims a peripheral region 200 of the field of view 106 based on the begin-rotation command. The peripheral region 200 surrounds the wearer's gaze target 112 (e.g., the virtual turtle). Further, the virtual-reality computing system 102 does not dim a focus region 202 that is spatially aligned with the user's gaze target 112. The focus region 202 may remain undimmed in order to draw the user's attention to the focus region 202 while the rotation of the virtual environment 108 is being performed. In some implementations, the focus region may be dimmed or otherwise altered, but in a manner that distinguishes it from the peripheral region 200.

The virtual-reality computing system 102 may dim the peripheral region 200 in any suitable manner. For example, the virtual-reality computing system 102 may dim the peripheral region 200 in an abrupt or quick manner (e.g., as little as one image frame) to temporarily decrease user immersion from the virtual-reality experience while the rotation of the virtual environment 108 is being performed. In some such implementations, the virtual-reality computing system 102 may dim the peripheral region 200 by making the real-world physical space more visible and the virtual environment 108 less visible in the peripheral region 200. For example, the virtual-reality computing system 102 may dim the peripheral region by increasing a transparency level of the peripheral region 200. This type of dimming may be performed instead of or in addition to changing a brightness of the peripheral region.

The peripheral region 200 may be any suitable size and/or any suitable shape. Likewise, the focus region 202 may be any suitable size and/or any suitable shape. In the depicted example, the focus region 202 is elliptical to appear as if the focus region 202 surrounds the virtual turtle. In other words, the focus region 202 may appear as if cut out from the dimmed peripheral region 200. The focus region 202 may be spatially aligned with the user's gaze target 112 in any suitable manner. In the depicted example, the focus region 202 is centered on a virtual position corresponding to the user's gaze target 112 when the begin-rotation command is received. In some implementations, the focus region may be snapped to an identified object near the gaze target when the begin-rotation command is received.

The peripheral region 200 may have any suitable degree of transparency when the peripheral region 200 is dimmed. In some implementations, the dimmed peripheral region 200 may be opaque. In other implementations, the virtual environment 108 may be at least partially viewable through the dimmed peripheral region 200.

Furthermore, the virtual-reality computing system 102 may visually present, via the near-eye display 104, a rotation indicator 204 that indicates a direction of rotation of the virtual environment 108 relative to an initial perspective 206 of the field of view 106. The rotation indicator 204 may take any suitable form to provide visual feedback to the user 100 of a direction of rotation of the virtual environment 108. In the depicted example, the rotation indicator 204 extends from the virtual turtle to a point on a perimeter of the focus region 202. The rotation indicator 204 may move along the perimeter of the focus region 202 as the virtual environment 108 rotates. In other words, the rotation indicator 204 takes the form of a virtual handle that appears to rotate the virtual turtle.

In the depicted example, when the begin-adjustment command is received, the virtual environment 108 is visually presented from an initial perspective 206 in which the virtual turtle's head is pointing rightward. Further, the rotation indicator 204 appears to extend rightward from the virtual turtle's head.

Figure 3:
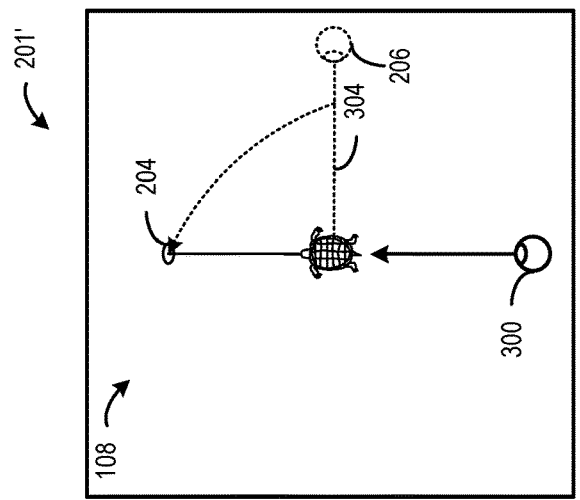
Figure 3:
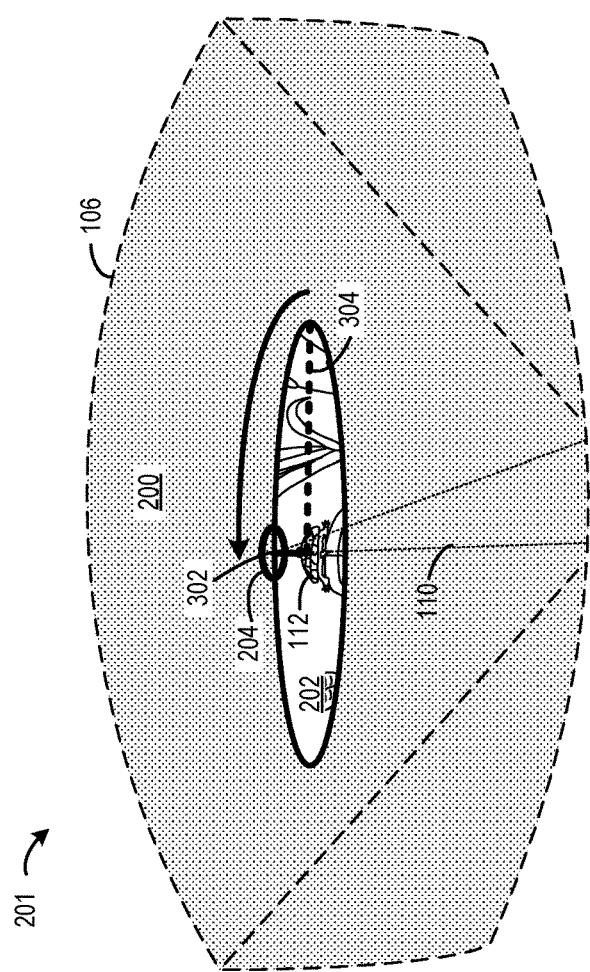

As shown in FIG. 3, the virtual-reality computing system 102 rotates the virtual environment 108 from the initial perspective 206 (shown in FIG. 2) to an intermediate perspective 300 based on a rotation command. In one example, the perspective of the virtual environment 108 is rotated based on the user's gaze 110 moving to an updated gaze target 302 subsequent to the begin-rotation command. In other words, the rotation command is generated based on the updated gaze target 302 that corresponds to a position along the perimeter of the circular focus region 202. For example, the virtual environment 108 may be rotated a number of degrees that corresponds to an arc length along the perimeter of the focus region 202 between the original position of the rotation indicator 204 (shown in FIG. 2) and the current position of the rotation indicator 204 corresponding to the updated gaze target 302.

Furthermore, the virtual-reality computing system 102 visually presents the rotation indicator 204 and an initial perspective indicator 304 to provide visual feedback of relative positional information of the virtual environment 108 that is being rotated. In particular, the rotation indicator 204 moves from the user's initial gaze target 112 to the updated gaze target 302. The initial perspective indicator 304 indicates an initial perspective from which the virtual environment 108 was rotated.

In the depicted example, the virtual environment 108 is rotated such that the virtual turtle's head is pointing into the page. Further, the rotation indicator 204 appears to extend from the virtual turtle's head further into the page. During the rotation, the rotation indicator 204 moves from the position of the initial perspective indicator 304 along the perimeter of the focus region 202 to the position of the updated gaze target 302. In other words, the rotation indicator 204 may be perceived by the user 100 as a virtual handle that is rotated counterclockwise a quarter turn around the perimeter of the focus region 202 to rotate the virtual turtle 90 degrees counterclockwise.

Figure 4:
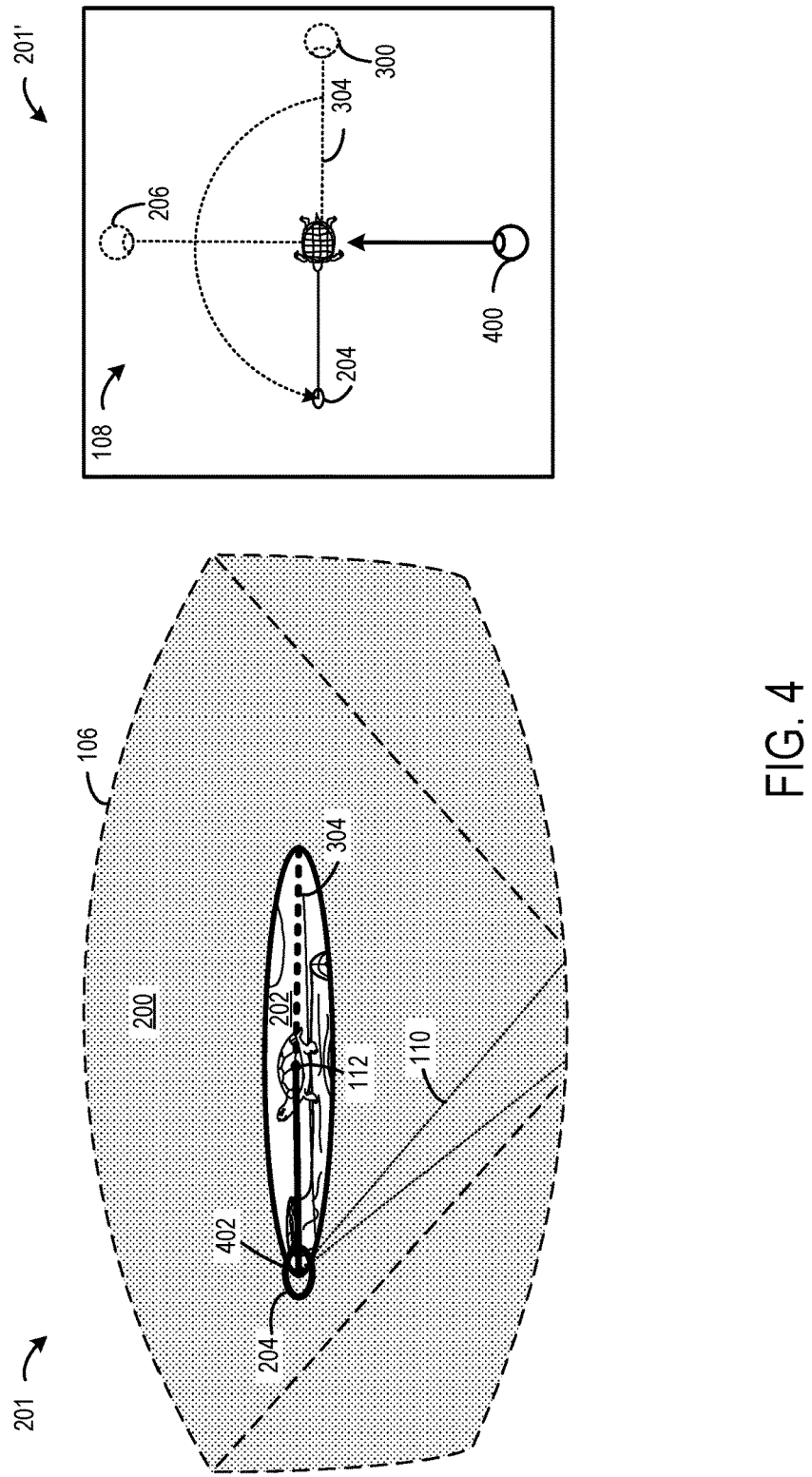

As shown in FIG. 4, the virtual-reality computing system 102 continues to rotate the virtual environment 108 from the intermediate perspective 300 (shown in FIG. 3) to an updated perspective 400 based on the rotation command.

In the depicted example, the virtual environment 108 is further rotated such that the virtual turtle's head is pointing leftward. Further, the rotation indicator 204 appears to extend from the virtual turtle's head leftward. During the rotation, the rotation indicator 204 moves from the position of the initial perspective indicator 304 along the perimeter of the focus region 202 to the position of the current gaze target 402. In other words, the rotation indicator 204 appears to rotate counterclockwise a half turn around the perimeter of the focus region 202 while the position of the virtual turtle rotates 180 degrees counterclockwise.

Figure 5:
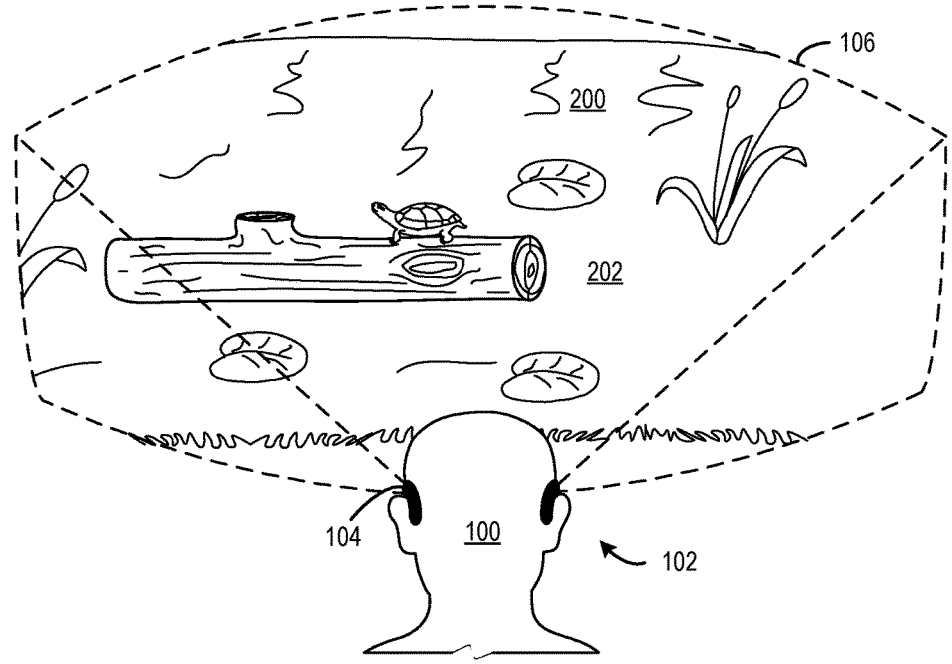
FIG. 5 shows the different perspective of the virtual environment resulting from the rotation approach shown in FIGS. 2-4.

As shown in FIG. 5, the virtual-reality computing system 102 brightens the peripheral region 200 of the field of view 106 based on an end-rotation command. For example, the peripheral region 200 may be brightened (or undimmed) to a previous brightness level of the peripheral region 200. In other words, the peripheral region 200 may be brightened to a same brightness level of the focus region 202. Accordingly, the virtual-reality computing system 102 may visually present, via the near-eye display 104, the updated perspective of the virtual environment 108 in an entirety of the field of view 106.

The above described rotation approach is non-limiting, and other rotation approaches may be executed. In another example, subsequent to the peripheral region being dimmed, whenever the user's gaze intersects the perimeter of the focus region, the virtual environment automatically rotates until the point of intersection appears to be the point on the perimeter of the focus region that is closest to the user's perspective. After the rotation is performed, the peripheral region is automatically brightened. In another example, the virtual environment may be repeatedly rotated in the same manner until an end-rotation command is received, at which point, the peripheral region is brightened. In another example, the virtual environment rotates in real-time to match the current gaze target until the end-rotation command is received. In another example, whenever the user's gaze makes a circular motion gesture, the virtual environment rotates to mimic the gesture regardless of a position of the user's gaze target while performing the gesture. In another example, whenever the user's gaze exits the focus region, a virtual handle is visually presented. The virtual handle appears to rotate the virtual environment in real time to match the current gaze target, until the user's gaze re-enters the focus region. In another example, a virtual location may be selected as a rotation point via user input, a line extending along the around between the user's current virtual location and the selected virtual location may be visually presented, a second virtual location may be selected via user input, and the virtual environment may be rotated from the user's current virtual location to the second virtual location about the rotation point. In another example, a virtual location is selected via user input, the field of view is dimmed except for the selected virtual location, the selected virtual location is fixed to the user's gaze in the left and right directions, but cannot move in the up and down directions, the selected virtual location is dragged to a target location in real time and dropped to brighten the field of view. In some implementations, prior to rotation, a user input may constrain the plane of rotation. Any suitable rotation approach may be employed to rotate the virtual environment without departing form the scope of this disclosure. In each different approach, a peripheral region of the field of view may be dimmed while the virtual environment is rotating.

Figure 6:
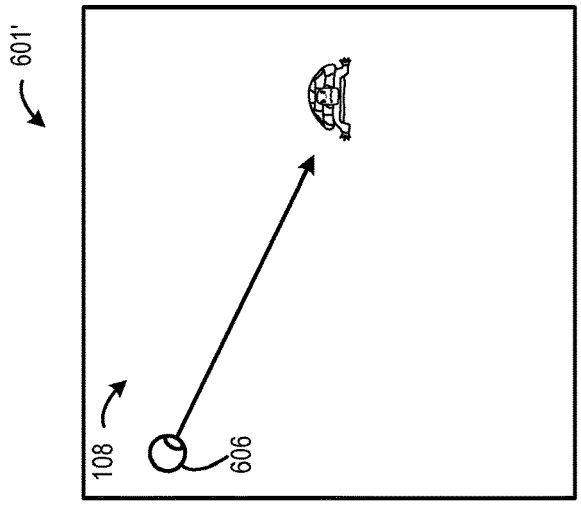
FIGS. 6-7 show an example approach for translating the virtual environment from the perspective shown in FIG. 1 to a different perspective.
Figure 6:
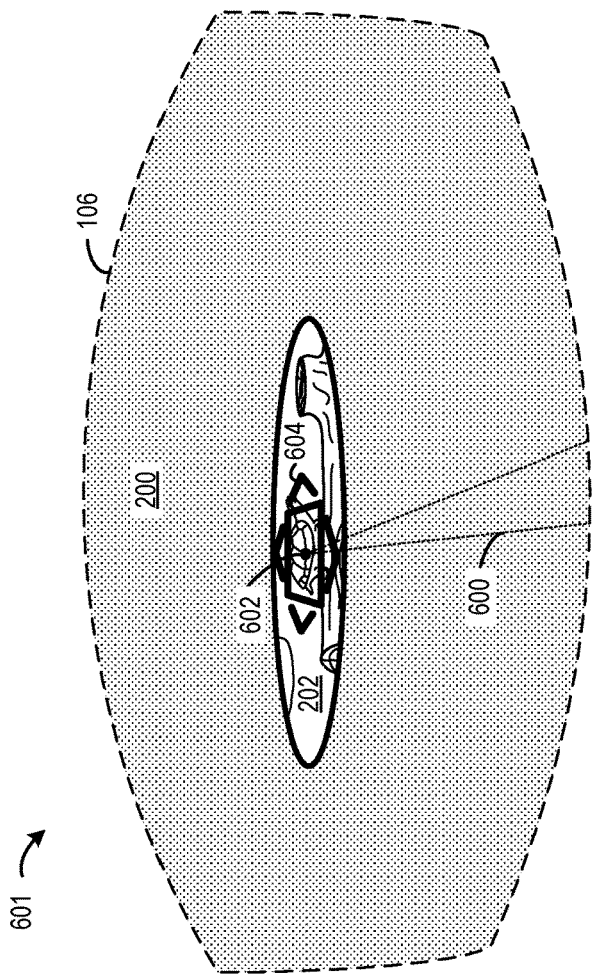
Figure 7:
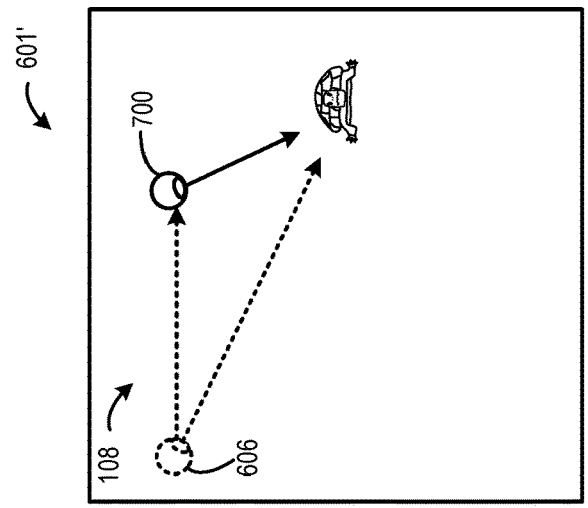
Figure 7:
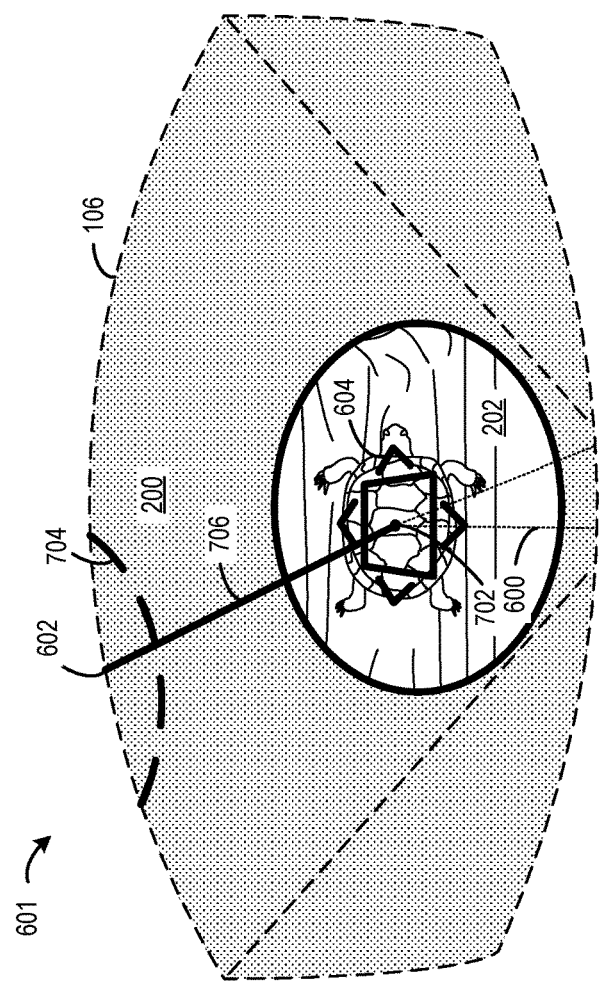
Figure 8:
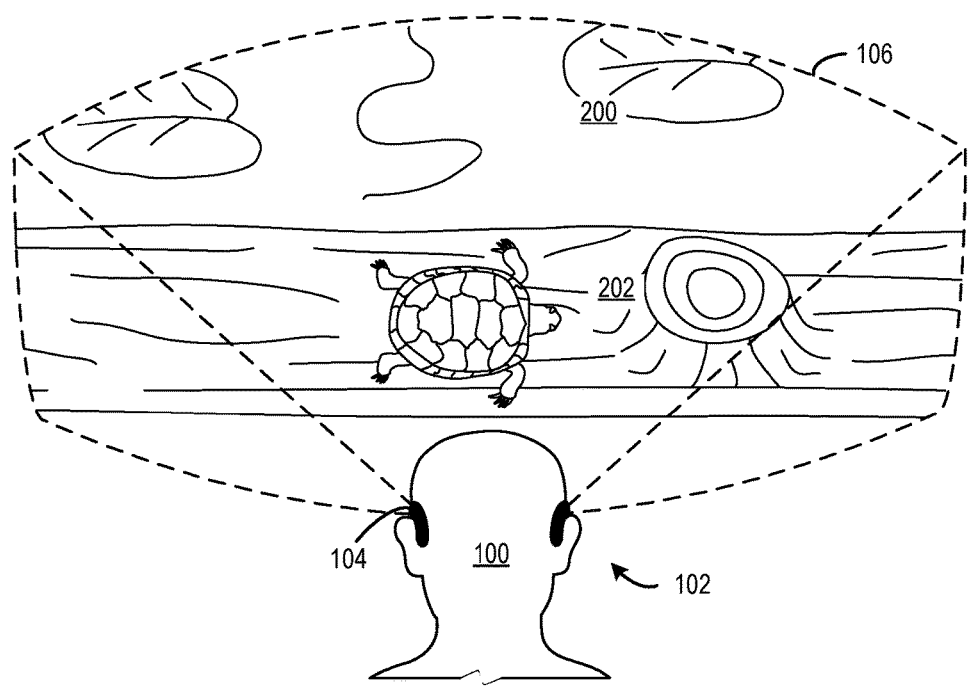
FIG. 8 shows the different perspective of the virtual environment resulting from the translation approach shown in FIGS. 6-7.

FIGS. 6-8 show an example translation of the virtual environment from the perspective shown in FIG. 1 to a different perspective. Note that FIGS. 6-7 include a first person perspective 601 of the field of view 106 as seen by a user viewing the virtual environment 108 via the near-eye display. FIGS. 6-7 also shows a top-view perspective 601' of selected aspects of the virtual environment 108. The top view perspective 601' is not displayed by the near-eye display 104.

As shown in FIG. 6, the virtual-reality computing system 102 dims the peripheral region 200 of the field of view 106 based on the begin-translation command. When the begin-translation command is received, the user's gaze 600 is directed at the user's gaze target 602. The peripheral region 200 surrounds the user's gaze target 602 (e.g., the virtual turtle). Further, the virtual-reality computing system 102 does not dim the focus region 202 that is spatially aligned with the user's gaze target 602.

As shown, the virtual-reality computing system 102 visually presents, via the near-eye display 104, a translation indicator 604. The translation indicator 604 may take any suitable form to provide a visual indication that the environment is ready for translation.

In the depicted example, the virtual environment 108 is oriented such that the virtual turtle's head is pointing rightward. Further, the translation indicator 604 appears to hover over the virtual turtle.

As shown in FIG. 7, the virtual-reality computing system 102 translates the virtual environment 108 relative to the initial perspective 606 (shown in FIG. 6) to an updated perspective 700 based on a translation command. In one example, the virtual-reality computing system 102 translates the perspective of the virtual environment 108 based on the user's gaze 600 moving to an updated gaze target 702 subsequent to the begin-translation command. In other words, the translation command is generated based on the updated gaze target 702. For example, the user moves the turtle with the user's gaze—e.g., gazing down will move the virtual turtle under the user's vantage point. The virtual environment 108 may be translated in any suitable direction and/or according to any suitable number of degrees of freedom (e.g., x, y, and/or z). In some implementations, prior to translation, a user input may constrain the plane of translation.

The virtual environment 108 may be translated a virtual distance that is scaled relative to an actual distance between the previous gaze target 602 and the updated gaze target 702. The virtual distance may be scaled in any suitable manner.

As illustrated, the virtual-reality computing system 102 visually presents the translation indicator 604 and a previous gaze direction 704 to provide visual feedback of relative positional information. The translation indicator 604 includes a trail 706 extending between the user's initial gaze target 602 and the updated gaze target 702.

In the depicted example, the virtual environment 108 is translated such that the virtual turtle appears to have moved closer to the updated perspective 700 relative to the initial perspective 606. In particular, the updated perspective 700 appears to be looking down from above the virtual turtle.

As shown in FIG. 8, the virtual-reality computing system 102 brightens the peripheral region 200 of the field of view 106 based on an end-translation command. Accordingly, the virtual-reality computing system 102 may visually present, via the near-eye display 104, the updated perspective of the virtual environment 108 based on the translation in an entirety of the field of view 106. The above described translation approach is non-limiting, and other translation approaches may be executed.

Figure 9:
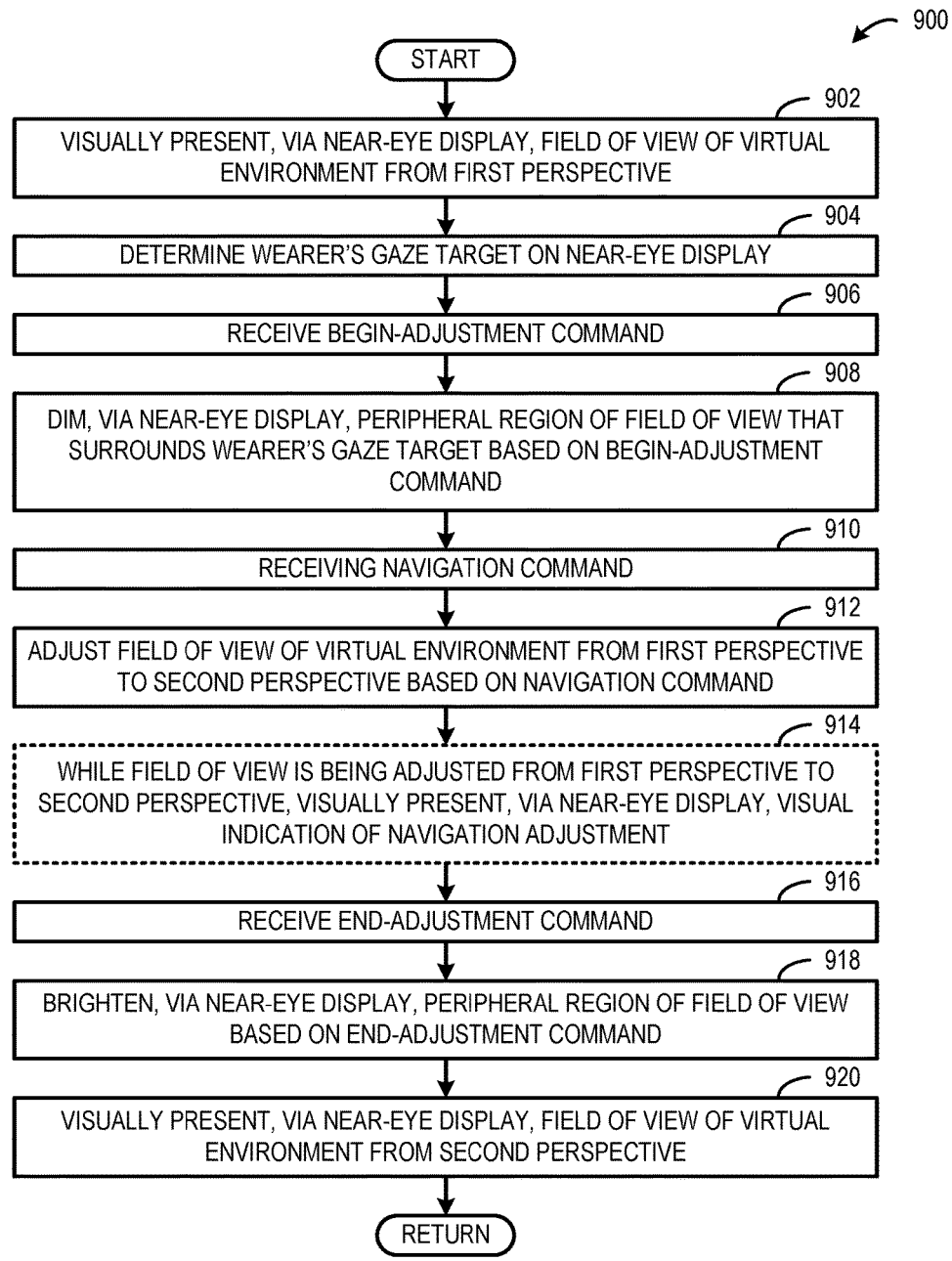
FIG. 9 shows an example method for navigating in a virtual environment using a virtual-reality computing system.

FIG. 9 shows an example method 900 for visually presenting a navigation in a virtual environment. The method 900 may be performed by the virtual-reality computing system 102 shown in FIG. 1, the virtual-reality computing system 1000 shown in FIG. 10, or the computing system 1100 shown in FIG. 11, as examples. In general, the method 900 may be performed by any suitable virtual-reality device.

At 902, the method 900 includes visually presenting, via a near-eye display, a field of view of a virtual environment from a first perspective. At 904, the method 900 includes determining a wearer's gaze target on the near-eye display. At 906, the method 900 includes receiving a begin-adjustment command. At 908, the method 900 includes dimming, via the near-eye display, a peripheral region of the field of view that surrounds the wearer's gaze target based on the begin-adjustment command. At 910, the method 900 includes receiving a navigation command. For example, the navigation command may include a rotation, a translation, or a combination of a rotation and a translation. At 912, the method 900 includes adjusting the field of view of the virtual environment from the first perspective to a second perspective based on the navigation command.

In some implementations, at 914, the method 900 optionally may include, while the field of view is being adjusted from the first perspective to the second perspective, visually presenting, via the near-eye display, a visual indication of the navigation adjustment. In the case of the navigation adjustment being a rotation, the visual indication may include a rotation indicator, such as rotation indicator 204 shown in FIGS. 2-4. In the case of the navigation adjustment being a translation, the visual indication may include a translation indicator, such as the translation indicator 604 shown in FIGS. 6-7.

At 916, the method 900 includes receiving an end-adjustment command. At 918, the method 900 includes brightening, via the near-eye display, the peripheral region of the field of view based on the end-adjustment command.

At 920, the method 900 visually presenting, via the near-eye display, the field of view of the virtual environment from the second perspective.

Figure 10:
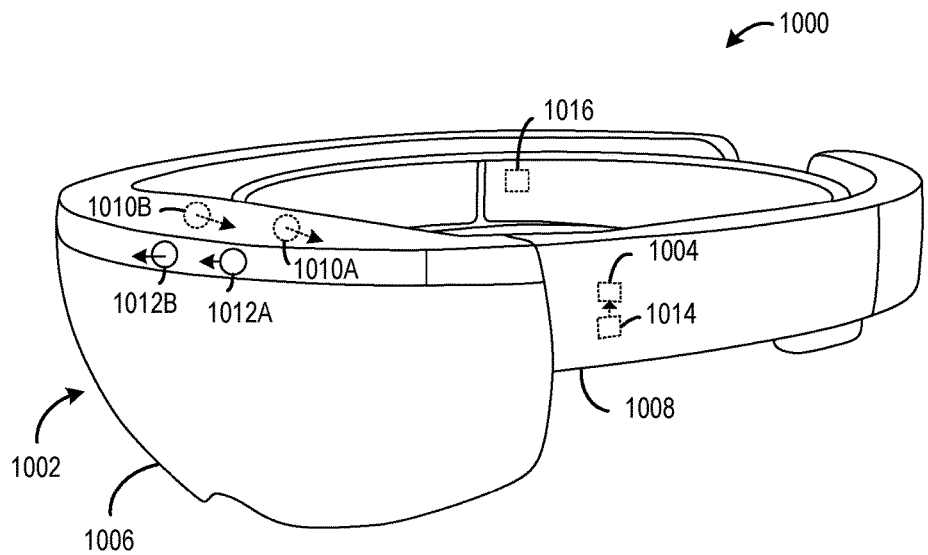
FIG. 10 shows an example virtual-reality computing system.

FIG. 10 shows aspects of an example virtual-reality computing system 1000 including a near-eye display 1002. The virtual-reality computing system 1000 is a non-limiting example of the virtual-reality computing system 102 shown in FIG. 1 and/or the computing system 1100 shown in FIG. 11.

The virtual-reality computing system 1000 may be configured to present any suitable type of virtual-reality experience. In some implementations, the virtual-reality experience includes a totally virtual experience in which the near-eye display 1002 is opaque, such that the wearer is completely absorbed in the virtual-reality imagery provided via the near-eye display 102.

In some implementations, the virtual-reality experience includes an augmented-reality experience in which the near-eye display 1002 is wholly or partially transparent from the perspective of the wearer, to give the wearer a clear view of a surrounding physical space. In such a configuration, the near-eye display 1002 is configured to direct display light to the user's eye(s) so that the user will see augmented-reality objects that are not actually present in the physical space. In other words, the near-eye display 1002 may direct display light to the user's eye(s) while light from the physical space passes through the near-eye display 1002 to the user's eye(s). As such, the user's eyes) simultaneously receive light from the physical environment and display light.

In such augmented-reality implementations, the virtual-reality computing system 1000 may be configured to visually present augmented-reality objects that appear body-locked and/or world-locked. A body-locked augmented-reality object may appear to move along with a perspective of the user as a pose (e.g., 6 degrees of freedom (DOF): x, y, z, yaw, pitch, roll) of the virtual-reality computing system 102 changes. As such, a body-locked, augmented-reality object may appear to occupy the same portion of the near-eye display 1002 and may appear to be at the same distance from the user, even as the user moves in the physical space. On the other hand, a world-locked, augmented-reality object may appear to remain in a fixed location in the physical space, even as the pose of the virtual-reality computing system 1000 changes. When the virtual-reality computing system 1000 visually presents world-locked, augmented-reality objects, such a virtual-reality experience may be referred to as a mixed-reality experience.

In some implementations, the opacity of the near-eye display 1002 is controllable dynamically via a dimming filter. A substantially see-through display, accordingly, may be switched to full opacity for a fully immersive virtual-reality experience.

The virtual-reality computing system 1000 may take any other suitable form in which a transparent, semi-transparent, and/or non-transparent display is supported in front of a viewer's eye(s). Further, implementations described herein may be used with any other suitable computing device, including but not limited to mobile computing devices, laptop computers, desktop computers, tablet computers, other wearable computers, etc.

Any suitable mechanism may be used to display images via the near-eye display 1002. For example, the near-eye display 1002 may include image-producing elements located within lenses 1006. As another example, the near-eye display 1002 may include a display device, such as a liquid crystal on silicon (LCOS) device or OLED microdisplay located within a frame 1008. In this example, the lenses 1006 may serve as, or otherwise include, a light guide for delivering light from the display device to the eyes of a wearer. Additionally or alternatively, the near-eye display 1002 may present left-eye and right-eye virtual-reality images via respective left-eye and right-eye displays.

The virtual-reality computing system 1000 includes an on-board computer 1004 configured to perform various operations related to receiving user input (e.g., gesture recognition, eye gaze detection), visual presentation of virtual-reality images on the near-eye display 1002, and other operations described herein.

The virtual-reality computing system 1000 may include various sensors and related systems to provide information to the on-board computer 1004. Such sensors may include, but are not limited to, one or more inward facing image sensors 1010A and 1010B, one or more outward facing image sensors 1012A and 1012B, an inertial measurement unit (IMU) 1014, and one or more microphones 1016. The one or more inward facing image sensors 1010A, 1010B may be configured to acquire gaze tracking information from a wearer's eyes (e.g., sensor 1010A may acquire image data for one of the wearer's eye and sensor 1010B may acquire image data for the other of the wearer's eye).

The on-board computer 1004 may be configured to determine gaze directions of each of a wearer's eyes in any suitable manner based on the information received from the image sensors 1010A, 1010B. The one or more inward facing image sensors 1010A, 1010B, and the on-board computer 1004 may collectively represent a gaze detection machine configured to determine a wearer's gaze target on the near-eye display 1002. In other implementations, a different type of gaze detector/sensor may be employed to measure one or more gaze parameters of the user's eyes. Examples of gaze parameters measured by one or more gaze sensors that may be used by the on-board computer 1004 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes.

The one or more outward facing image sensors 1012A, 1012B may be configured to measure physical environment attributes of a physical space. In one example, image sensor 1012A may include a visible-light camera configured to collect a visible-light image of a physical space. Further, the image sensor 1012B may include a depth camera configured to collect a depth image of a physical space. More particularly, in one example, the depth camera is an infrared time-of-flight depth camera. In another example, the depth camera is an infrared structured light depth camera.

Data from the outward facing image sensors 1012A, 1012B may be used by the on-board computer 1004 to detect movements, such as gesture-based inputs or other movements performed by a wearer or by a person or physical object in the physical space. In one example, data from the outward facing image sensors 1012A, 1012B may be used to detect a wearer input performed by the wearer of the virtual-reality computing system 1000, such as a gesture. Data from the outward facing image sensors 1012A, 1012B may be used by the on-board computer 1004 to determine direction/location and orientation data from imaging environmental features) that enables position/motion tracking of the virtual-reality computing system 1000 in the real-world environment. In some implementations, data from the outward facing image sensors 1012A, 1012B may be used by the on-board computer 1004 to construct still images and/or video images of the surrounding environment from the perspective of the virtual-reality computing system 1000.

The IMU 1014 may be configured to provide position and/or orientation data of the virtual-reality computing system 1000 to the on-board computer 1004. In one implementation, the IMU 1014 may be configured as a three-axis or three-degree of freedom (3DOF) position sensor system. This example position sensor system may, for example, include three gyroscopes to indicate or measure a change in orientation of the virtual-reality computing system 1000 within 3D space about three orthogonal axes (e.g., roll, pitch, and yaw).

In another example, the IMU 1014 may be configured as a six-axis or six-degree of freedom (6DOF) position sensor system. Such a configuration may include three accelerometers and three gyroscopes to indicate or measure a change in location of the virtual-reality computing system 1000 along three orthogonal spatial axes (e.g., x, y, and z) and a change in device orientation about three orthogonal rotation axes (e.g., yaw, pitch, and roll). In some implementations, position and orientation data from the outward facing image sensors 1012A, 1012B and the IMU 1014 may be used in conjunction to determine a position and orientation (or 6DOF pose) of the virtual-reality computing system 1000.

The virtual-reality computing system 1000 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 1016 may be configured to measure sound in the physical space. Data from the one or more microphones 1016 may be used by the on-board computer 1004 to recognize voice commands provided by the wearer control the virtual-reality computing system 1000.

The on-board computer 1004 may include a logic machine and a storage machine, discussed in more detail below with respect to FIG. 11, in communication with the near-eye display 1002 and the various sensors of the virtual-reality computing system 1000.

Figure 11:
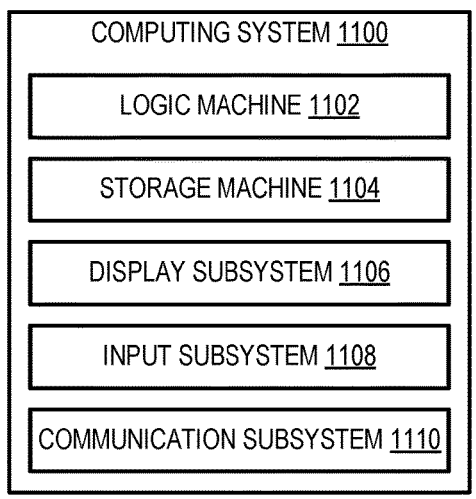
FIG. 11 shows an example computing system.

FIG. 11 schematically shows a non-limiting implementation of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), virtual-reality devices, and/or other computing devices. For example, the computing system 1100 may be a non-limiting example of the virtual-reality computing system 102 of FIG. 1 and/or the virtual-reality computing system 1000 of FIG. 10.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine 1102 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1102 may include one or more processors configured to execute software instructions. Additionally or alternatively, the logic machine 1102 may include one or more hardware or firmware logic machines configured to execute hardware or firmware instructions. Processors of the logic machine 1102 may be single-core or multi-core, and the instructions executed thereon may be configured for sequential, parallel, and/or distributed processing. Individual components of the logic machine 1102 optionally may be distributed among two or more separate devices, which may be remotely located and/or configured for coordinated processing. Aspects of the logic machine 1102 may be virtualized and executed by remotely accessible, networked computing devices configured in a cloud-computing configuration.

Storage machine 1104 includes one or more physical devices configured to hold instructions executable by the logic machine 1102 to implement the methods and processes described herein. When such methods and processes are implemented, the state of storage machine 1104 may be transformed e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices. As a non-limiting example, display subsystem 1106 may include the near-eye displays described above.

When included, input subsystem 1108 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem 1110 may allow computing system 1100 to send and/or receive messages to and/or from other devices via a network such as the Internet.

Additional aspects of the present disclosure are described below. According to one aspect, a virtual-reality computing system, comprises a near-eye display, a gaze detection machine configured to determine a wearer's gaze target on the near-eye display, a logic machine, and a storage machine holding instructions executable by the logic machine to visually present, via the near-eye display, a field of view of a virtual environment from a first perspective, receive a begin-adjustment command, dim, via the near-eye display, a peripheral region of the field of view that surrounds the wearer's gaze target based on the begin-adjustment command, receive a navigation command, adjust the field of view of the virtual environment from the first perspective to a second perspective based on the navigation command, receive an end-adjustment command, brighten, via the near-eye display, the peripheral region of the field of view based on the end-adjustment command, and visually present, via the near-eye display, the field of view of the virtual environment from the second perspective. In this aspect, the navigation command may be a rotation command, the field of view may be rotated around a virtual position in the virtual environment from the first perspective to the second perspective based on the rotation command, and the virtual position may correspond to the wearer's gaze target when the begin-adjustment command is received. In this aspect, the rotation command may be based on the wearer's gaze target subsequent to the begin-adjustment command. In this aspect, the storage machine may hold instructions executable by the logic machine to while the field of view is being adjusted from the first perspective to the second perspective based on the rotation command, visually present, via the near-eye display, a rotation indicator indicating a direction of rotation of the field of view. In this aspect, the navigation command may be a translation command, the field of view may be translated relative to a virtual position in the virtual environment from the first perspective to the second perspective based on the translation command, and the virtual position may correspond to the wearer's gaze target when the begin-adjustment command is received. In this aspect, the field of view of the virtual environment may be adjusted to the second perspective based on the wearer's gaze target subsequent to the begin-adjustment command. In this aspect, the storage machine may hold instructions executable by the logic machine to while the field of view is being adjusted from the first perspective to the second perspective based on the translation command, visually present, via the near-eye display, a translation indicator. In this aspect, the begin-adjustment command and the end-adjustment command may be based on user input received from a user put device. In this aspect, the navigation command may be based on user input received from a user input device. In this aspect, the begin-adjustment command and the end-adjustment command may be based on the wearer's gaze.

According to another aspect, a method for controlling a virtual-reality computing system comprises visually presenting, via a near-eye display, a field of view of a virtual environment from a first perspective, determining a wearer's gaze target on the near-eye display, receiving a begin-adjustment command, dimming, via the near-eye display, a peripheral region of the field of view that surrounds the wearer's gaze target based on the begin-adjustment command, receiving a navigation command, adjusting the field of view of the virtual environment from the first perspective to a second perspective based on the navigation command, receiving an end-adjustment command, brightening, via the near-eye display, the peripheral region of the field of view based on the end-adjustment command, and visually presenting, via the near-eye display, the field of view of the virtual environment from the second perspective. In this aspect, the navigation command may be a rotation command, the field of view may be rotated around a virtual position in the virtual environment from the first perspective to the second perspective based on the rotation command, and the virtual position may correspond to the wearer's gaze target when the begin-adjustment command is received. In this aspect, the rotation command may be based on the wearer's gaze target subsequent to the begin-adjustment command. In this aspect, the method may further comprise while the field of view is being adjusted from the first perspective to the second perspective based on the rotation command, visually presenting, via the near-eye display, a rotation indicator indicating a direction of rotation of the field of view. In this aspect, the navigation command may be a translation command, the field of view may be translated relative to a virtual position in the virtual environment from the first perspective to the second perspective based on the translation command, and the virtual position may correspond to the wearer's gaze target when the begin-adjustment command is received. In this aspect, the field of view of the virtual environment may be adjusted to the second perspective based on the wearer's gaze target subsequent to the begin-adjustment command. In this aspect, the method may further comprise while the field of view is being adjusted from the first perspective to the second perspective based on the translation command, visually presenting, via the near-eye display, a translation indicator.

According to another aspect, a virtual-reality computing system, comprises a near-eye display, a gaze detection machine configured to determine a wearer's gaze target on the near-eye display, a logic machine, and a storage machine holding instructions executable by the logic machine to visually present, via the near-eye display, a field of view of a virtual environment from a first perspective, receive a begin-adjustment command, dim, via the near-eye display, a peripheral region of the field of view that surrounds the wearer's gaze target based on the begin-adjustment command, adjust the field of view of the virtual environment from the first perspective to a second perspective based on the wearer's gaze target subsequent to the begin-adjustment command, receive an end-adjustment command, brighten, via the near-eye display, the peripheral region of the field of view based on the end-adjustment command, and visually present, via the near-eye display, the field of view of the virtual environment from the second perspective. In this aspect, the begin-adjustment command may be a begin-rotation command, the field of view may be rotated around a virtual position in the virtual environment from the first perspective to the second perspective based on the wearer's gaze subsequent to the begin-rotation command, and the virtual position may correspond to the wearer's gaze target when the begin-rotation command is received. In this aspect, the begin-adjustment command may be a begin-translation command, the field of view may be translated relative to a virtual position in the virtual environment from the first perspective to the second perspective based on the wearer's gaze subsequent to the begin-translation command, and the virtual position may correspond to the wearer's gaze target when the begin-translation command is received.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A virtual-reality computing system, comprising:
a near-eye display;
a gaze detection machine configured to determine a wearer's gaze target on the near-eye display;
a logic machine; and
a storage machine holding instructions executable by the logic machine to:
visually present, via the near-eye display, a field of view of a virtual environment from a first perspective;
receive a begin-adjustment command;
dim, via the near-eye display, a peripheral region of the field of view that surrounds the wearer's gaze target based on the begin-adjustment command;
receive a rotation command;
rotate the field of view around a virtual position of the virtual environment from the first perspective to a second perspective based on the rotation command while maintaining dimming of the peripheral region of the field of view and while visually presenting a rotation indicator indicating a direction of rotation of the field of view, wherein the virtual position corresponds to the wearer's gaze target when the begin-adjustment command is received, and wherein the field of view is rotated by an amount that is based on the wearer's gaze target subsequent to the begin-adjustment command;
receive an end-adjustment command;
brighten, via the near-eye display, the peripheral region of the field of view based on the end-adjustment command; and
visually present, via the near-eye display, the field of view of the virtual environment from the second perspective.

2. The virtual-reality computing system of claim 1, wherein the storage machine holds instructions executable by the logic machine to:
receive a translation command;
translate the field of view to a different virtual position in the virtual environment having a third perspective based on the translation command.

3. The virtual-reality computing system of claim 2, wherein the field of view of the virtual environment is translated to the third perspective based on the wearer's gaze target subsequent to the begin-adjustment command.

4. The virtual-reality computing system of claim 2, wherein the storage machine holds instructions executable by the logic machine to:
while the field of view is being adjusted from the second perspective to the third perspective based on the translation command, visually present, via the near-eye display, a translation indicator.

5. The virtual-reality computing system of claim 1, wherein the begin-adjustment command and the end-adjustment command are based on user input received from a user input device.

6. The virtual-reality computing system of claim 1, wherein the rotation command is based on user input received from a user input device.

7. The virtual-reality computing system of claim 1, wherein the begin-adjustment command and the end-adjustment command are based on the wearer's gaze.

8. A method for controlling a virtual-reality computing system, the method comprising:
visually presenting, via a near-eye display, a field of view of a virtual environment from a first perspective;
determining a wearer's gaze target on the near-eye display;
receiving a begin-adjustment command;
dimming, via the near-eye display, a peripheral region of the field of view that surrounds the wearer's gaze target based on the begin-adjustment command;
receiving a rotation command;
rotate the field of view around a virtual position of the virtual environment from the first perspective to a second perspective based on the rotation command while maintaining dimming of the peripheral region of the field of view and while visually presenting a rotation indicator indicating a direction of rotation of the field of view, wherein the virtual position corresponds to the wearer's gaze target when the begin-adjustment command is received, and wherein the field of view is rotated by an amount that is based on the wearer's gaze target subsequent to the begin-adjustment command;
receiving an end-adjustment command;
brightening, via the near-eye display, the peripheral region of the field of view based on the end-adjustment command; and visually presenting, via the near-eye display, the field of view of the virtual environment from the second perspective.

9. The method of claim 8, further comprising:
receiving a translation command;
translating the field of view to a different virtual position in the virtual environment having a third perspective based on the translation command.

10. The method of claim 9, wherein the field of view of the virtual environment is translated to the third perspective based on the wearer's gaze target subsequent to the begin-adjustment command.

11. The method of claim 9, further comprising:
while the field of view is being adjusted from the second perspective to the third perspective based on the translation command, visually presenting, via the near-eye display, a translation indicator.

12. A virtual-reality computing system, comprising:
a near-eye display;
a gaze detection machine configured to determine a wearer's gaze target on the near-eye display;
a logic machine; and
a storage machine holding instructions executable by the logic machine to:
visually present, via the near-eye display, a field of view of a virtual environment from a first perspective;
receive a begin-rotation command;
dim, via the near-eye display, a peripheral region of the field of view that surrounds the wearer's gaze target based on the begin-rotation command;
rotate the field of view around a virtual position of the virtual environment from the first perspective to a second perspective based on the wearer's gaze target subsequent to the begin-rotation command while maintaining dimming of the peripheral region of the field of view, wherein the virtual position corresponds to the wearer's gaze target when the begin-rotation command is received, and wherein the field of view is rotated by an amount that is based on the wearer's gaze target subsequent to the begin-rotation command;
receive an end-rotation command;
brighten, via the near-eye display, the peripheral region of the field of view based on the end-rotation command; and
visually present, via the near-eye display, the field of view of the virtual environment from the second perspective.

13. The virtual-reality computing system of claim 12, wherein the instructions are further executable by the logic machine to:
receive a translation command;
translate the field of view to a different virtual position in the virtual environment having a third perspective based on the translation command.

* * * * *